United States Patent [19]

Schmitt et al.

[11] Patent Number: 5,275,478
[45] Date of Patent: Jan. 4, 1994

[54] MOUNTING UNIT, COMPRISING A VALVE BLOCK ASSEMBLY AND A CONTROL UNIT

[75] Inventors: Edgar Schmitt, Vaihingen/Enz; Matthias Moerbe, Ilsfeld-Helfenberg, both of Fed. Rep. of Germany

[73] Assignee: Robert Bosch GmbH, Stuttgart, Fed. Rep. of Germany

[21] Appl. No.: 910,073
[22] PCT Filed: Dec. 19, 1990
[86] PCT No.: PCT/DE90/00974
§ 371 Date: Jul. 14, 1992
§ 102(e) Date: Jul. 14, 1992
[87] PCT Pub. No.: WO91/10583
PCT Pub. Date: Jul. 25, 1991

[30] Foreign Application Priority Data

Jan. 16, 1990 [DE] Fed. Rep. of Germany ....... 4001017

[51] Int. Cl.⁵ .............................................. B60T 8/32
[52] U.S. Cl. .................................. 303/119.2; 137/884; 251/129.15
[58] Field of Search ............... 303/119.2; 439/34, 682, 439/692; 137/884; 251/129.15; 307/10.1, 147, 150

[56] References Cited

U.S. PATENT DOCUMENTS 5,040,853 8/1991 Burgdorf et al. ................ 303/119.2
5,137,455 8/1992 Moerbe et al. ................. 137/884 X

FOREIGN PATENT DOCUMENTS 105219 4/1984 European Pat. Off. .
0373551 12/1989 European Pat. Off. .
3813138 11/1989 Fed. Rep. of Germany .
2568205 7/1985 France .
842238 7/1960 United Kingdom .
2188995 10/1987 United Kingdom .

Primary Examiner—Robert J. Oberleitner
Assistant Examiner—Lee W. Young
Attorney, Agent, or Firm—Edwin E. Greigg; Ronald E. Greigg

[57] ABSTRACT

A valve block assembly and an electronic control unit are separably joined to one another by means of a contact pin and contact sheath connection. The contact sheaths are disposed in a caplike insulating housing part of the valve block assembly. The contact sheaths are connected by flexible leads to connection contacts of the valves of the valve block assembly. This equalizes tolerances between the valves and the contact sheaths, on the one hand, and on the other thermally shields the control unit. The contact pins, anchored in the control unit, are connected to a stamped grid embedded in the control unit housing to the lead segments of which grid electronic components of the control unit are connected. These components are located on a ceramic support plate, which is joined to a heat conduction plate by adhesive bonding. The interior of the control unit housing is closed off by an outer wall serving as a protective covering.

8 Claims, 1 Drawing Sheet

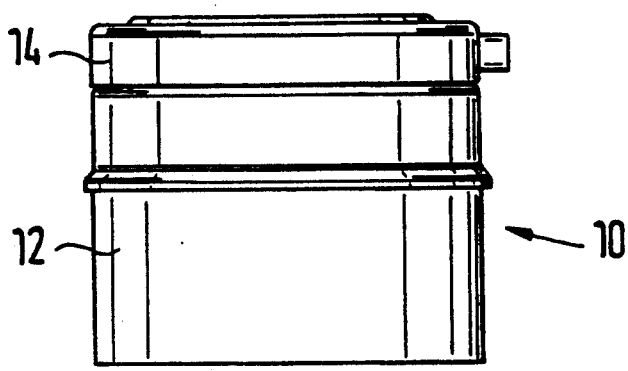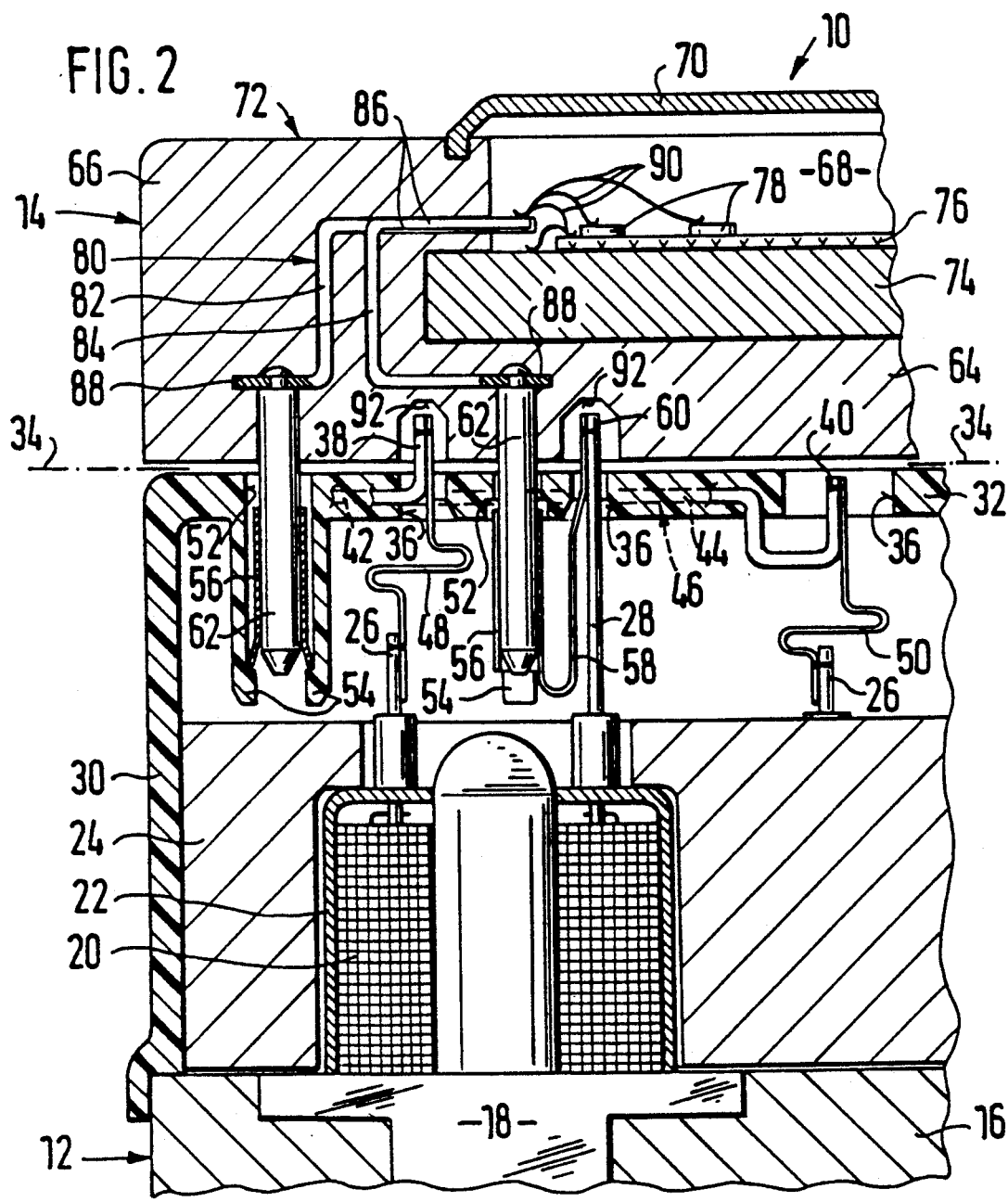

MOUNTING UNIT, COMPRISING A VALVE BLOCK ASSEMBLY AND A CONTROL UNIT

BACKGROUND OF THE INVENTION

The invention is based on a mounting unit, comprising a valve block assembly and a control unit, as defined hereafter.

A mounting unit of this kind is already known (German Offenlegungsschrift 38 13 138), in which the control unit is joined to the valve block assembly using a frame-like adaptor part inserted between the two. Electrical bonding of the valves of the valve block assembly to the control unit is done with the aid of contact prongs, which are part of a stamped grid that forms conduction segments in a housing wall of the control unit. These contact prongs engage spring contact elements of the valves. Because of the engagement of the contact prongs with the spring contact elements that occurs when the control unit is joined to the valve block assembly, very close tolerances must be adhered to when the valves are installed in the valve block assembly, in order to assure a secure electrical connection. Moreover, the control unit is relatively complicatedly made of a plurality of plate-like housing walls, which extend parallel to the plane separating the control unit in the valve block assembly and are joined to a frame by riveting or adhesive bonding. Since the walls carry electronic components, electrically bonded leads must be joined together in various planes. In the known control unit this is done by soldering, after the housing walls and frame are installed; because the soldering points are located at some depth in the control unit, increased labor is required. Another disadvantage of the prior art mounting unit is that the valves are closely adjacent to one of the control unit walls that carries electronic components. These components are therefore subjected to increased strain from the coils of the valves, which give off heat. Although the outer aluminum wall of the control unit is intended to dissipate heat to the ambient air, the wall has a ceramic support plate on the inside, with electronic components, and if this wall suffers sudden strain the danger exists that the support plate will be destroyed, with the consequence of failure of the control unit.

ADVANTAGES OF THE INVENTION

The mounting unit according to the invention, comprising a valve block assembly and a control unit an advantage over the prior art that first, the heat transfer from the valves of the valve block assembly to the control unit is reduced, and second, production and assembly tolerances of the valves have no influence on the relationship between contact sheaths of the valve block assembly and the contact prongs of the control unit. Moreover, the embodiment of the control unit has advantages for mounting purposes and protects the control unit against mechanical attack.

Advantageous further features of and improvements to the mounting unit disclosed are possible with the provisions recited hereinafter.

The embodiment recited herein simplifies the connection of the valves considerably and increases the security of the electrical connections.

With a the further feature of the assembly unit defined herein, secure connections of the leads and contacts are attained, which can be produced simply with the housing part mounted on the valve block assembly, because of the great accessibility.

The provision set forth has the advantage of a placement of the ceramic plate in a manner favorable for mounting purposes, with its electric components readily accessible for testing and electrical bonding purposes.

As a result of the further feature of the mounting unit recited, secure, protected lead connections are attained that enable bonding of the electrical components of the control unit in a manner favorable for mounting.

DRAWING

An exemplary embodiment of the invention is shown in simplified form in the drawing and described in further detail in the ensuing description. Shown are FIG. 1, a view of a mounting unit comprising a valve block assembly and a control unit, and FIG. 2, a detail, shown in section, of the mounting unit on a different scale.

DESCRIPTION OF THE EXEMPLARY EMBODIMENT

The mounting unit 10 shown in FIGS. 1 and 2 of the drawing comprises a valve block assembly 12 and an electronic control unit 14. The mounting unit 10 is part of a brake pressure regulating system, such as an antilock and/or traction control system, of a vehicle brake system, not shown. The valve block assembly 12 therefore communicates, in a manner not shown, with a master brake cylinder and with wheel brake cylinders of the brake system. Nor is the connection of the electronic control unit 14 to a voltage source and to sensors that monitor the rotation of the vehicle wheels shown.

The valve block assembly 12 has a housing 16, in which a plurality of electromagnetically actuatable valves 18 are disposed next to and behind one another (only one is visible in FIG. 2). The valve part 22 of the valve 18 that has the magnet coil 20 protrudes past the housing 16; a holder plate 24 mounted on the housing 16 fits over the valve 18. Connection contacts, specifically a relatively short ground connection contact 26 and a relatively long connection contact 28, protrude past the holder plate 24 beginning at the magnet coil 20 of the valve part 22 and which are connected to the wires of the coil 20.

The valve block assembly 12 is provided with a caplike insulating housing part 30 of plastic, which with a wall 32 fits over the valves 18 at some distance from them. The wall 32 extends along a separation plate 34 between the valve block assembly 12 and the control unit 14. The caplike housing part 30 encompasses the holder plate 24 and is fixed to the housing 16 of the valve block assembly 12.

On the side toward the control unit, the wall 32 of the housing part 30 is provided with a plurality of openings 36. The endless contact 28 of each valve 18 extends through one opening 36. Other openings 36 receive exposed end portions 38, 40 of lead segments 42, 44 of a stamped grid 46 embedded in the wall 32. The lead segments 42, 44 of the stamped grid 46 are joined together and serve to connect the group connection contacts 26 of the valves 18. To this end, the ground connection 26 of the valve 18 and the exposed end portion 38 of the lead are connected by welding to a flexible lead 48 made of a ribbon wire or narrow strip of sheet metal. The region where the end portion 38 of the lead is connected to the flexible lead 48 may be located above the wall 32 of the housing part 30, which makes it easier to perform the welding operation. In the variant shown on the right in FIG. 2, the connection may also be embodied in such a way that the exposed end portion 40 of the lead segment 44, which is embodied with an offset bend, terminates inside the opening 36 of the wall 32, where it can be welded to a flexible lead 50.

The caplike housing part 30 is provided with openings 52 in its wall 32. Adjoining these openings, segment extensions 54 oriented toward the holder plate 24 begin at the wall 32. Resiliently embodied contact sheaths 56 are threaded through the openings 52 and retained by the segment extensions 54. A flexible lead 58, embodied by the sheath material, begins at each of the contact sheaths 56, leading to the exposed end portion 60 of the connection contact 28 of the valves 18, where it is also materially joined. The contact sheaths 56, intended for receiving contact prongs 62 of the control unit 14, are secured axially against both being pulled out and being pushed through, as seen from the drawing. (The contact sheath 56 shown on the left in FIG. 2, and the associated segment extensions 54, are shown rotated by 90° compared with the sheath arrangement shown on the right.) In a manner not shown, the stamped grid 46 is likewise connected to a contact sheath 56.

While the positioning of the contact sheaths 56 in the caplike housing part 30 must be done with relatively close tolerances, to attain secure bonding to the contact pins 62 of the electronic control unit 14, the positioning of the valves 18 in the valve block assembly 12 may have relatively wide tolerances. These wide tolerances present no difficulty in bonding the valves 18 to the stamped grid 46 and the contact sheaths 56, because the flexible leads 48, 50 and 58 compensate for these deviations.

The electronic control unit 14 has a relatively great thickness at the housing wall 64 bordering the separation plane 34; toward the edge, this thickness is reinforced with an encompassing frame 66. As a result, an interior 68 of the control unit 14 is formed. The interior 68 of the control unit 14 is closed off from the outside with an outer wall 70 that engages the frame 66 and assures protection against mechanical factors. The wall 64, frame 66 and outer wall 70 form a housing 72 for the control unit 14, the interior 68 of which receives a heat conduction plate 74 and a ceramic support plate 76 for electronic components 78. The heat conduction plate 74 extends along the side of the housing wall 64 of the control unit 14 remote from the separation plane 34. The aluminum heat conduction plate 74, on its exposed side, is joined to the ceramic support plate 76 by adhesive bonding.

The control unit 14 is likewise provided with at least one stamped grid 80 for electric connection of the electronic components 78 to the contact pins 62 that are anchored in the housing wall 64. The stamped grid 80 has lead segments 82, 84 bent into the shape of a U and a Z. These segments are essentially embedded in the frame 66 of the control unit housing 72, and with their legs 86, 88 they peripherally encompass the heat conduction plate 74, which is received form-fittingly in the frame 66. The lead segment legs 88 extending in the housing wall 64 of the control unit housing 72, which is produced from insulating plastic, are connected to the contact pins 62 by welding or riveting. The lead segment legs 86 of the stamped grid 80, contrarily, terminate in the open in the interior 68 of the control unit housing 72 and are joined by ribbon wires 90 to the electronic components 78 of the support plate 76.

The valve block assembly 12 and the electronic control unit 14 can each be mounted and checked independently of one another. These two component groups of the mounting unit 10 are connected together by placing the control unit 14 upon the valve block assembly 12. In an embodiment of the valve block assembly 12 in which the end portions 60 of the connection contacts 28 of the valves 18 and end portions 38 of the leads protrude past the separation plane 34, suitably-sized recesses 92 are provided in the wall 64 of the control unit housing 72. Such provisions can be dispensed with in an embodiment having end portions 40 of the leads that are countersunk in the caplike housing part 30 of the valve block assembly 12. Seals and retaining elements, not shown, such as detent connections, retaining brackets or the like, may be provided to secure the connection between the control unit 14 and the valve block assembly 12.

The foregoing relates to preferred exemplary embodiments of the invention, it being understood that other variants and embodiments thereof are possible within the spirit and scope of the invention, the latter being defined by the appended claims.

We claim:

1. A mounting unit (10) including a control unit housing (72) including an interior (68), a valve bock assembly, (12) for brake pressure regulating systems, and an electronic control unit (14) separably joined to said valve block assembly, comprising:
   electromagnetically actuatable valves (18) disposed on the valve block assembly (12) having connection contacts (26, 28), which are indirectly joined to contact pins (62) of the control unit (14);
   the contact pins (62) are anchored in a housing wall (64) of the control unit (14) extending parallel to a separation plane (34) between the valve block assembly (12) and the control unit housing (72);
   electronic components (78) received in the control unit housing (72) of the control unit (14) on a ceramic support plate (76) are connected to a stamped grid (80) that forms lead segments (82, 84) and is embedded in the housing wall (64);
   the interior (68) of the control unit housing (72) is closed, on a side remote from the separation plate (32), by an outer wall (70) placed upon it;
   the valve block assembly (12) is provided with a caplike insulating housing part (30), which with a wall (32) extending parallel to the separation plane (34) fits over the valves (18);
   contact sheaths (56) which cooperates with the contact pins (62) of the control unit (14) are received in the wall 32 of the housing part (30);
   the connection contacts (26, 28) of the valves (18)are indirectly joined to the contact sheaths (56) by flexible leads (48, 58);
   the ceramic support plate (76) for the electronic components (78) is disposed indirectly on the side of said housing wall (64) of the control unit (14) remote from the separation plane (34); and
   the outer wall (70) of the control unit housing (72) embodies a protective covering for the interior (68) of the control unit.

2. A mounting unit as defined by claim 1, in which a stamped grid (46) with electrically interconnected lead segments (42, 44) is embedded in the wall (32) of the caplike housing part (30), parallel to the separation plane (34), and ground connection contacts (26) of the valves (18) are joined to exposed end portions (38, 40) of the lead segments by flexible leads (48, 50).

3. A mounting unit as defined by claim 2, in which the connection contacts (28) of the valves (18), the end portions (38) of the lead segments of the stamped grid (46) toward the valves below the separation plane, and the flexible leads (48, 53) of the valves below the separation plane, and the flexible leads (48, 53) of the valve connection contacts (26), as well as the contact sheaths (56) extend through the wall (32) of the caplike housing part (30) and are materially joined on the outside of the housing part by their end portions.

4. A mounting unit as defined by claim 1, in which a heat conduction plate (74), comprising aluminum, extends along the side of the housing wall (64) of the control unit (14) remote from the separation plane (34), on which heat conduction plate the ceramic support plate (76) is secured by adhesive bonding.

5. A mounting unit as defined by claim 4, in which the stamped grid (80) of the control unit (14) has lead segments (82, 84) bent into a selected shape to include first and second legs (86, 88) and said lead segments fit peripherally around the heat conduction plate (74), the second lead segment legs (88) are joined t said control pins (62) extending in the housing wall (64) of the control unit (14) adjoining the separation plane (34), and the first lead segment legs (86) for connecting electronic components (78) of the support plate (76) terminate in an open space in the interior (68) of the control unit (14).

6. A mounting unit as defined by claim 5, in which at least one of said lead segments is bent into a U-shape.

7. A mounting unit as defined by claim 5, in which at least one of said lead segments is bent into a Z-shape.

8. A mounting unit as defined by claim 5, in which at least one of said lead segments is bent into a U-shape and another of said lead segments is bent into a Z-shape.

* * * * *